(12) United States Patent
Abir

(10) Patent No.: US 6,692,170 B2
(45) Date of Patent: Feb. 17, 2004

(54) METHOD AND APPARATUS FOR TEXT INPUT

(76) Inventor: Eli Abir, 106 Spring St., South Salem, NY (US) 10590

( * ) Notice: Subject to any disclaimer, the term of this patent is extended or adjusted under 35 U.S.C. 154(b) by 0 days.

(21) Appl. No.: 10/077,983

(22) Filed: Feb. 20, 2002

(65) Prior Publication Data

US 2002/0122197 A1 Sep. 5, 2002

Related U.S. Application Data

(60) Provisional application No. 60/269,896, filed on Feb. 21, 2001.

(51) Int. Cl.[7] .................................................. B41J 5/28
(52) U.S. Cl. ........................................ 400/472; 400/489
(58) Field of Search ................................. 400/472, 489

(56) References Cited

U.S. PATENT DOCUMENTS

| | | |
|---|---|---|
| 4,130,882 A | 12/1978 | Swanstrom et al. |
| 4,185,282 A | 1/1980 | Pick |
| 4,310,254 A | 1/1982 | Anadoliiski et al. |
| 4,679,951 A | 7/1987 | King et al. |
| 4,696,492 A | 9/1987 | Hardin |
| 4,842,428 A | 6/1989 | Suzuki |
| 5,007,008 A | 4/1991 | Beers |
| 5,105,375 A | 4/1992 | Lapeyre |
| 5,128,672 A | 7/1992 | Kaehler |
| 5,258,748 A | 11/1993 | Jones |
| 5,432,948 A | 7/1995 | Davis et al. |
| 5,634,134 A | 5/1997 | Kumai et al. |
| 5,844,561 A * | 12/1998 | Tanimoto et al. ........... 345/703 |
| 5,893,133 A | 4/1999 | Chen |
| 5,917,476 A * | 6/1999 | Czerniecki ................... 345/156 |
| 5,945,928 A | 8/1999 | Kushler et al. |
| 5,973,688 A | 10/1999 | May |
| 5,977,948 A * | 11/1999 | Nishibori ..................... 345/467 |
| 6,073,097 A | 6/2000 | Gould et al. |
| 6,092,043 A | 7/2000 | Squires et al. |
| 6,101,468 A | 8/2000 | Gould et al. |
| 6,122,613 A | 9/2000 | Baker |
| 6,167,377 A | 12/2000 | Gillick et al. |
| 6,208,435 B1 * | 3/2001 | Zwolinski ..................... 358/473 |

FOREIGN PATENT DOCUMENTS

| | | | | |
|---|---|---|---|---|
| JP | 09050483 A | * | 2/1997 | ............ G06K/9/03 |
| JP | 2001312397 A | * | 11/2001 | ............. G06F/3/14 |

* cited by examiner

*Primary Examiner*—Charles H. Nolan, Jr.
(74) *Attorney, Agent, or Firm*—Arnold & Porter

(57) ABSTRACT

An apparatus for text input and a method for its use. The apparatus includes a display device, a computing device, and an input device. The computer device is configured to generate a character or plurality of characters and to cause the display device to display the character or characters at a desired position on the display device screen. The input device operates to enlarge the character or plurality of characters depending on the position of the input device relative to characters displayed on said display device. The input device is configured to permit a user to select the enlarged character or plurality of characters.

31 Claims, 5 Drawing Sheets

| \ | 1 | 2 | 3 | 4 | 5 | 6 | 7 | 8 | 9 | 0 | BKS |
|---|---|---|---|---|---|---|---|---|---|---|---|
| TAB | Q | W | E | R | T | Y | U | I | O | P | \ |
| LOCK | A | S | D | F | G | H | J | K | L | ; | ENT |
| SHIFT | Z | X | C | V | B | N | M | , | . | / | SHIFT |
|  |  |  | SPACE |  |  | SPACE |  |  | SPACE |  |  |

METHOD AND APPARATUS FOR TEXT INPUT

RELATED INVENTION

This application claims priority to Provisional Application Serial No. 60/269,896 by the same inventor ("Method and Apparatus For Text Input"), filed Feb. 21, 2001, the entirety of which is hereby incorporated by reference.

STATEMENT OF THE INVENTION

This invention relates to method and apparatus for inputting text for word processing and other communications. More specifically, the invention relates to a technique whereby text and related entries, normally too numerous to be legibly presented together on a conventional keyboard device, are input by the input device magnifying and highlighting a selection of appropriate characters forming words, and/or phrases enabling the user to choose the desired character (representing a word), word, or phrase, or any other unit of meaning in a language.

BACKGROUND OF THE INVENTION AND PRIOR ART

This invention relates to the field of input techniques for text representing independent units of meaning—represented by characters, words, and phrases—in a computing environment. In particular, this invention presents a "virtual keyboard" which allows a user to input characters, words and phrases in an efficient and timely manner. For illustration, this application will speak to the input of language characters, with the knowledge that such characters form words and/or phrases. However, the present invention can be applied to input any character (or set of characters) desired, not just language characters, including numbers, symbols, and the like.

For foreign language character input, a problem with inputting the characters in a computer is the key set necessary for accurate and reliable input. Individuals using the English language utilize well-known key sets to input characters, such as the standard QWERTY keyboard. However, individuals of non-English languages encounter problems when inputting characters using standard keyboard devices. The extent of the problem varies depending on the basis of the language. For the Romance languages, such as Spanish, French, and German, little effort is required to solve the problem as those languages utilize the English alphabet as the basis for their language. Special letters using diacritical marks (such as the umlaut, e.g.: ü) can be input through a keystroke combination to place the diacritical mark over the appropriate letter.

However, for character languages, such as Chinese, Korean, and Japanese; the problem exists due to the inability of standard English-alphabet characters to create the special characters and the number of characters in a specific language. Thus, utilizing an alphabet-alphabet keyboard (such as the standard QWERTY keyboard), it is impossible to create the characters in a meaningful manner. For example, the Chinese characters cannot be readily re-created by modifying the standard keyboard input. Even more importantly, the sheer number of characters makes foreign language keyboards inappropriate for computer input. For example, in the Hanzi Chinese character alphabet, there are anywhere from 3000 to 6000 common characters utilized for communication. Obviously, a keyboard utilizing the standard method of input of one letter/character per keystroke would be impractical.

Prior art solutions to these problems are unsatisfactory for an efficient method of accurate and comprehensive input of foreign language characters. One approach to the problem has been to allow a pen-based input of foreign language characters. Utilizing this approach, a user "selects" a character through the computer "pen" and a display set of potential words is displayed. The user then selects the appropriate word, or inputs more characters to refine the display set to the desired word. This technique is inappropriate for many reasons; a user may have to input several characters to arrive at the desired word. That is, the character set returned by the pen-based input is necessarily limited so that the user is not presented with the full choice of appropriate words or phrases. The user must continue inputting characters to have the computer-generated (and statistically sampled) character set return the appropriate word. (At its basic level, merely using a pen-based system to select individual characters to form a word or phrase is inappropriate due to the time required to input long word strings.) In addition, the user must go through several selection steps to arrive at the appropriate word or phrase. Other prior art solutions similar to that described above but using traditional input methods (e.g., a keyboard) are likewise inappropriate for the needs of efficient, reliable, and comprehensive character input.

Other prior art techniques focus on "chording" selection: selecting two or more input parameters, such as keys on a keyboard, simultaneously to obtain a desired character. Still other prior art techniques focus on multiple stroke methods to obtain the desired character: many modern limited keypads, such as those used for cellular telephones, allow character input by multiple selection of certain keys (e.g., pressing the "3" key twice to select the character "E"). These techniques are inappropriate for the same reasons discussed above: time and efficiency of entered characters. By forming words or phrases on a character-by-character basis, a tremendous amount of time is required, rendering anything but short messages nearly impossible to achieve. In addition to the time required for character input, the system is also inefficient in that it does not recognize words or phrases associated with the initial character such that manual input through a multiple stroke selection technique is required to form the desired words and phrases.

Still other prior art techniques use a phonetic or phoneme system for multiple selection character input. In these techniques the individual characters are not presented to the user for selection—instead the user is given a choice of various phonetic symbols organized in a pre-defined arrangement. The user selects the English language phonetic equivalent of the desired word or phrase, and the input device returns possible foreign language characters that potentially match the English language phonetics. This technique is inappropriate in that it relies on the input of the phonetic equivalent of the desired word; a user must form and then select the appropriate phonetic word or word stem. In addition, the same phonetic input can identify more than one word or phrase, requiring the user to select from a list of the appropriate phrase with the input pronunciation.

Finally, prior art techniques for inputting foreign character based words or phrases use the laborious method of forming those characters using individual keys. In these techniques the actual character itself is formed by selecting multiple graphic symbols. For example, particular Chinese language characters are formed by inputting the graphic symbols "\","-","_",""", and the like. Obviously, a number of keystrokes must be input to form even one character, let alone words and phrases.

Thus, in view of the foregoing state of the art, it is an object of the present invention to provide an input device and method that enables the efficient, reliable, and comprehensive method to forming foreign words or phrases in a computing system.

BRIEF DESCRIPTION OF THE INVENTION

According to the present invention, there is provided a text input method encompassing the following: a display means capable of displaying a virtual keyboard having individual characters that comprise the appropriate character set used to form words and phrases; a partition area set within the display means for delineating the appropriate character keyset; an input method for selecting both the individual characters and, in an efficient manner, the desired word or phrase; and a selection method for selecting the appropriate word or phrase.

Conceptually, the invention provides a method whereby any number of characters and/or words, and/or phrases, can be assembled on a single keyboard input device. The text input method of the present invention operates as follows. First the user is provided an appropriate area of the display means that contains the keyboard—the entire set of characters from the universe to be input. Using that display area, the user selects one part of that display area; as the user manipulates the input device over the portion of the display area, in one embodiment, words appear for selection by the user. The words which appear are magnified according to a user-defined resolution, in a predetermined area, so as to assist the user to locate the appropriate character. Similarly, the user may fluidly change the location of the predetermined area in which the magnified characters appear by scrolling in any direction (i.e., complete 360 degree flexibility) with techniques that either accelerate or decelerate the movement through the magnified characters in the predetermined area of the keyboard.

As an example, if the text input device of the present invention represented the English language, in one embodiment an entire dictionary of English words would be provided on the keyboard, arranged in a user-defined manner, with words starting with the letter "A" in the top left area of the keyboard and the words beginning with the letter "Z" at the bottom right. In this embodiment, when first viewed on the display area the words themselves will be far too small to be legible. However, as the user moved a text input device, such as a computer mouse pointer, over the keyboard, the words located on the computer screen at the position of the computer mouse pointer would be magnified in a predetermined area, such as an insert box. For example, suppose the user desires to enter the word "ensign" on the text input device of the present invention. The user operates the computer mouse pointer in the keyboard area of the display screen to locate the "E" section of the keyboard, where words beginning with the letter "E" would be presented to the user in a viewable manner by magnification. The user may, for example, land on words beginning with "ed". The user can then manipulate the computer mouse pointer (by using smaller movements) toward the "en" section on the way toward the desired word ("ensign"). Until the target word is magnified in the insert box, the user will further manipulate the computer mouse pointer passing over the magnified words beginning with the letters "ens", and so on, until the appropriate word ("ensign") is one of the magnified words in the insert box, at which point the user may freeze the insert box in place and operate a computer selection technique (such as "right-clicking" on a computer mouse button) to select the word "ensign." Note that multiple words may appear magnified at any point during the selection process, so that, for example, at one point the words "enshroud," "ensiform," "ensign," "ensilage," and "ensile" would appear, from which the user could easily select the desired word.

According to the present invention, there is also provided a text input method encompassing, in addition to the above described invention, the ability to utilize a dictionary, thesaurus, or other language reference tool to assist the user in the input of characters, words or phrases in the appropriate character based language.

Thus, the present invention enables the efficient, reliable, and comprehensive method of forming foreign words and phrases for use in a computing system. Note, of course, that the computing environment can work in stand-alone applications and computers, in networked applications, and in wireless environments. The present invention allows a user to easily and quickly select the appropriate word or phrase by targeting an approximate location for the word or phrase based on its position relative to either the user-defined organization scheme of the entire keyboard, or subdivided portions of the keyboard designating broad categories of words (such as the first letter of a word for a dictionary that is organized alphabetically). Then, a set of words or phrases is magnified to provide guideposts to find, and ultimately select the target word. The size of the insert box relative to the size of the keyboard is user defined, as is the size of the font size. The present invention also works with multiple input systems and is not limited to any one system. That is, the present invention allows an input method that includes use of a computer mouse, computer pen, touch-screen keyboard/keypad, voice-recognition, or optical based systems.

DETAILED DESCRIPTION OF A PREFERRED EMBODIMENT OF THE PRESENT INVENTION

A preferred embodiment of the present invention will now be described.

Figure 1:
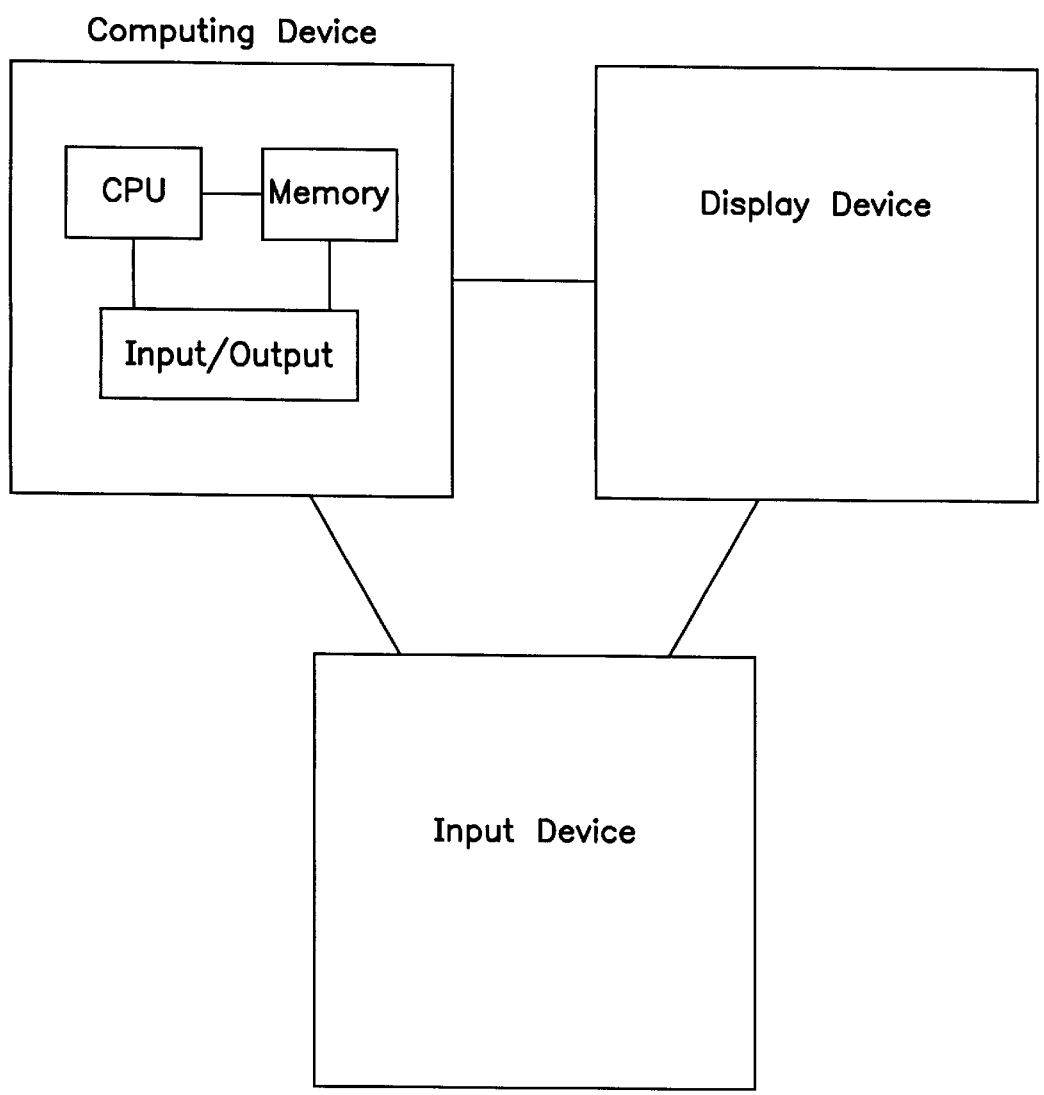
FIG. 1 represents a schematic structure of a preferred embodiment of the present invention.

The present invention is utilized on a common computer system having at least a display means, an input method, and a processor. The display means can be any of those readily available in the prior art, such as cathode ray terminals, liquid crystal displays, flat panel displays, and the like. The processor means also can be any of those readily available and used in a computing environment such that the means is supplied to allow the computer to operate to perform the present invention. Finally, an input method is utilized to allow the input of relevant language characters, words, phrases or any other unit of meaning such as abbreviations and acronyms, to operate the text input method according to the present invention. One schematic representation of an embodiment of the present invention is shown in FIG. 1.

The display means includes a partition area. The partition area is a designated portion of the display means used to delineate the appropriate character "keyboard" or "keypad". If a separate input device such as a touch screen is utilized, the partition area on the display is unnecessary. Note that although this invention makes use of the terms "keyboard" and "keypad", the present invention does not limit those terms to their conventional definitions. Instead, the present invention includes a "virtual keyboard:" a keyboard or keypad presented in the partition area on the display means, a touch screen or any other input method that can be programmed to dynamically accommodate the specific needs of the present invention.

The virtual keyboard includes any set of language characters necessary to select words or phrases in that language. Thus, the virtual keyboard is variably sized, depending on the specific characters, character sets, or character strings required for inputting words or phrases. As an example, a Hebrew language virtual keyboard of the present invention would have in its partition area all of the Hebrew words logically arranged in a manner readily comprehended by the user (usually by starting with the first letter in the word). This logical order of the characters may vary depending on the specific language; while the Hebrew virtual keyboard might start with words with the letter ALEF in the top left corner of a square partition area, with words beginning with the last letter in the alphabet appearing in the bottom right corner of said partition area, the character positioning might be different for other languages. Moreover, the arrangement and numbers of rows and columns and other specifics and considerations of the keyboard screen layout and visual design are user-defined. Each language can be arranged logically in any user-defined way. The "key" of the keyboard could have landmarks like the first letter of the words in each location. Of course, the words in the English language could also be displayed according to the present invention, placed alphabetically across the virtual keyboard in rows and columns. The language characters may be individual characters, or combined characters in a manner appropriate to the specific language. Thus, the keyboard of the present invention encompasses all the words of a given language desired to be included by the user—by manipulating the input (as described below) and the keyboard designators the user can readily select the appropriate character (representing an independent unit of meaning), word, or phrase.

The present invention also utilizes a specific input method to select the appropriate word or phrase from the virtual keyboard. One preferred embodiment of the present invention uses a cursor method of selecting the appropriate language word. In this method, the cursor is manipulated in a manner to select one key on the virtual keyboard (with said key representing an individual character, or set of characters, or word or phrase). Cursor manipulation may occur through known input techniques—using a computer mouse, using optical recognition techniques, using voice recognition techniques, using pen-based input systems, and the like. A touch screen manipulated with the user's fingertips can also be used. In any selection method, the words in the magnified insert box would be frozen by a user command, and a second user action would designate the word choice among the magnified words.

Figures 2A, 2B:
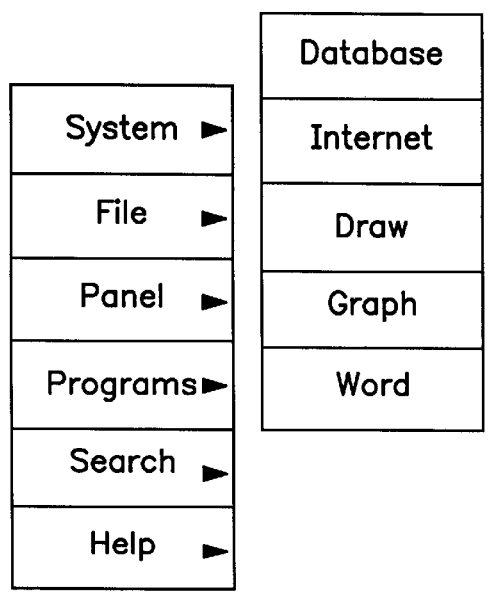
FIGS. 2a and 2b represent text input devices of the prior art.

Thus, the present invention differs from prior art systems such as those shown in FIG. 2. FIG. 2a represents a "character map" of the type known in the art (included, for example, in the QWERTY keyboard system), wherein upon selection a representation of a keyboard appears. This "character map" operates by having the user input single characters as opposed to words, and a finite amount of characters bounded by an amount visible to the user are displayed at any given time. FIG. 2b represents the "nested menu" of the type known in the art (included, for example, in the Windows operating system), wherein a user moves a cursor over a selection of visible operations in a "menu," which in turns opens another selection of visible operations in another "sub-menu," which open and close according to the movement of the cursor to possible further sub-menus, and so on. Unlike these menu driven systems, the present invention allows the user to fluidly and dynamically use a single screen to manipulate any number of words or other units of meaning, by magnifying the location of any point based on its relative location to the whole word set.

Figure 3:
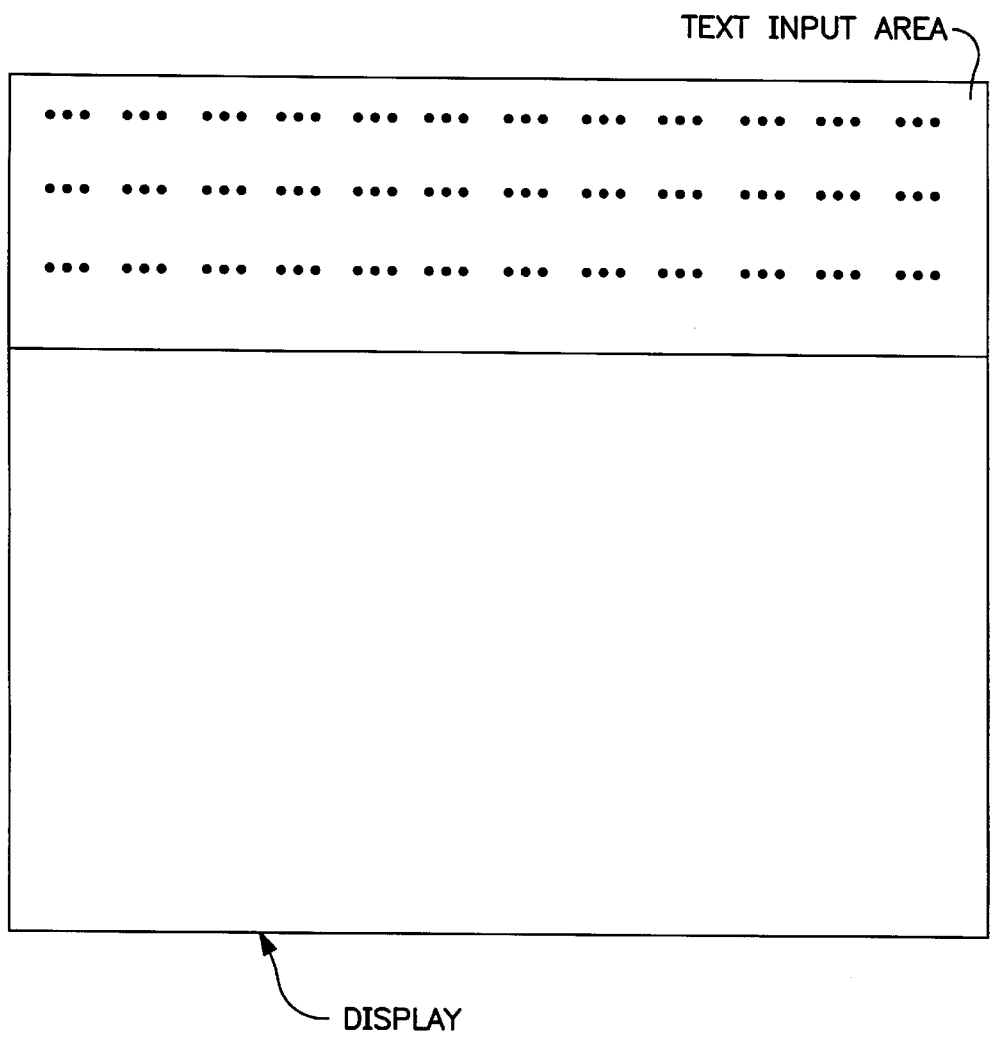
FIG. 3 represents characters on a display device in a manner to be operated on by the present invention.
Figure 4:
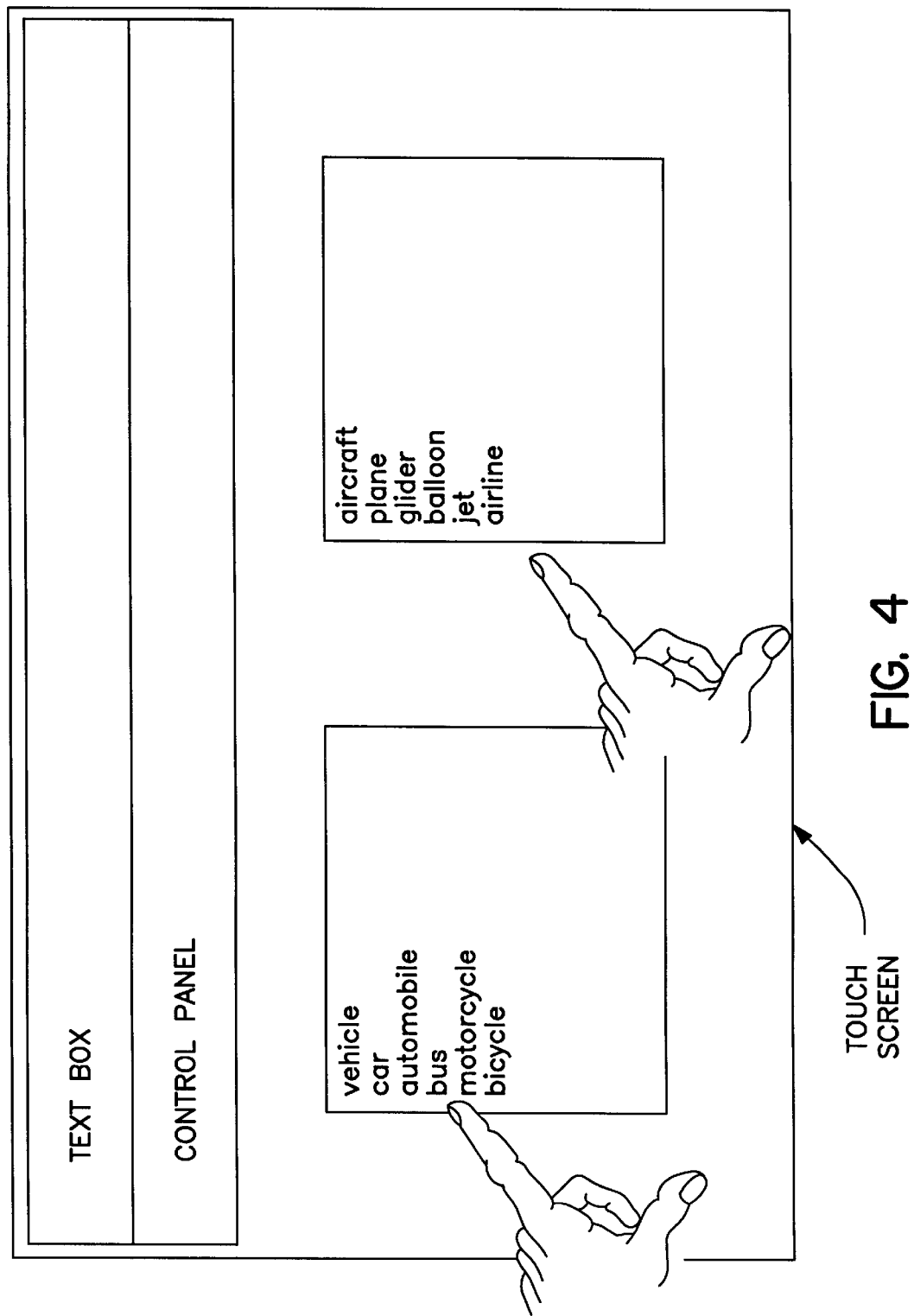
FIG. 4 represent an operation of the present embodiment using a touch screen virtual keyboard.
Figure 5A:
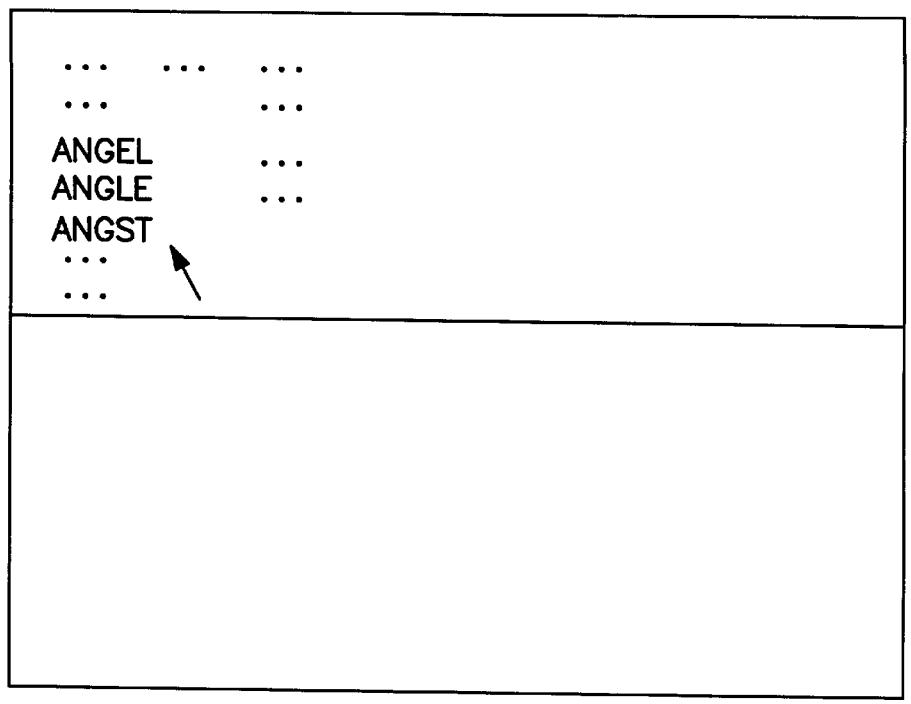
FIGS. 5a and 5b represent an operation of an embodiment of the present invention.
Figure 5B:
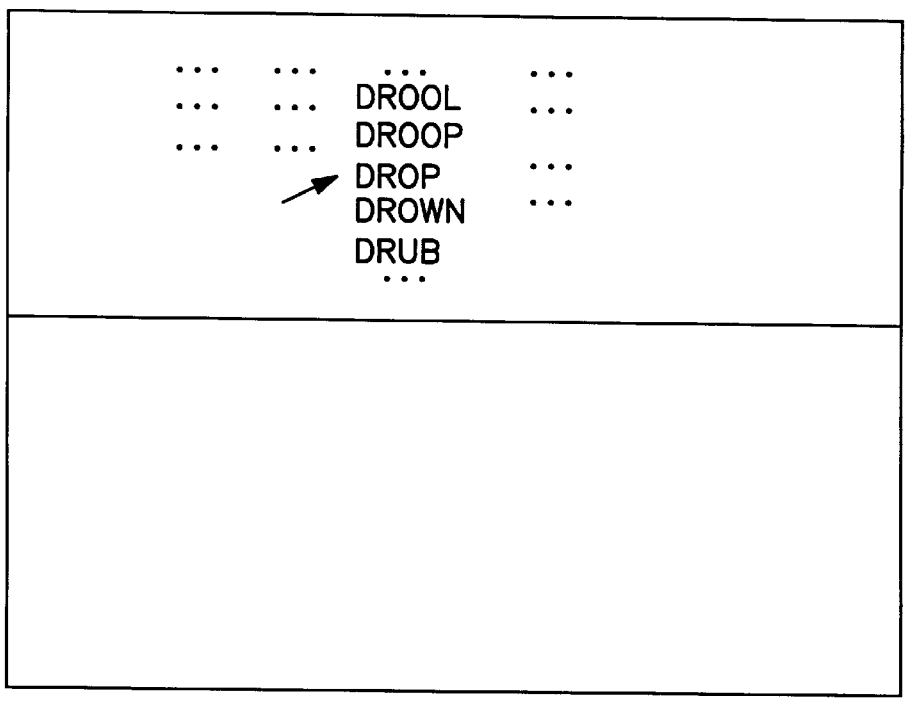

A display device may operate as shown in FIG. 3 in an embodiment of the present invention, wherein a predesignated list of words is present in a non-visible manner. Operating a cursor by means of an input device enlarges the portions of the predesignated list of words, as shown in FIG. 4. The cursor operation, as detailed throughout the present invention and as known in the art, may encompass common "touch screen" technology wherein a person's finger is used to navigate a computer screen, with input occurring by "touching" parts of the screen and activating a predesignated operation. This type of operation in the present invention is shown in FIG. 4. FIG. 5a shows an enlargement of words beginning with the letters "ans," while FIG. 5b shows, in the same display, an enlargement of words beginning with the letters "dr." (Note that although FIGS. 3, 4, 5a, and 5b show words in the English language, the present invention may operate to include words in other foreign languages, characters, and characters used in foreign languages.)

According to another embodiment of the present invention, placing the cursor over an appropriate key of the virtual keyboard selects a word/phrase set list. This step is accomplished using methods like the systems known in the art represented by FIGS. 2a or 2b. This selection of the set list may occur by manual selection, such as "clicking" on a computer mouse, or may occur automatically when the cursor is placed over the appropriate character key. Selection occurs by having the set list appear on the display means in a manner separate from the virtual keyboard, or can temporarily layover and cover the entire language keyboard. This subset of the entire language will be arranged on the set list screen in the same manner the entire language is on the entire keyboard screen. The set list is designated, or kept open for user input, until such condition occurs that causes the set list to not be designated. The preferred embodiment keeps the set list open until the user performs an action of either selecting a word or phrase from the set list or manually designating the set list closed. Other methods for closing the set list may also be provided, such as having the set list close automatically upon the passage of a designated period of time.

As in the overall keyboard, the individual words and/or phrases appearing in the set list will not be immediately visible to the user. The set list associated with a selected character key should be so large as to not be visibly available for placement in the set list. The set list operates on very large groups of words but can be used as a tool to narrow the scope and offer better location perspective for locating target words. When the set list screen is generated, the same magnification technique is utilized to facilitate user selection. With the set list window open, the user manipulates the cursor or otherwise moves through the designated set list. As this motion occurs, the appropriate words or phrases are magnified automatically and made visible to the user. In this manner a user can then locate the desired word or phrase (since it will be visible in a magnified state) and then select that word or phrase.

Once the set list has been chosen, selection of a word or phrase can occur in a multiple step process. The preferred embodiment encompasses the following steps: 1) activate the magnification window (e.g., by clicking on a mouse button or depressing a key) on an approximate location of the target word relative to the overall set list (instead of relative to the entire language)—upon activation the window is kept stable (i.e., frozen); 2) move in the direction of the target word based on magnified words in the window; 3) highlight or designate the appropriate letter, word, or word string from the magnified words of the set list by moving cursor over a set of magnified words that includes the appropriate choice and holding the magnified insert box; and 4) select a word or word string by clicking a mouse button or depressing a key. For example, upon opening of the set list screen and moving the magnification box to a set of words that includes the target word, the user may freeze the magnification window in a place by clicking on a mouse button; the user then uses the mouse to move the cursor over the appropriate choice in the set list; the user then clicks the mouse button again to select the chosen word, or word string. Selection can occur in a "reduced-step" process: The set list may appear automatically as the cursor is placed over the appropriate character; the set list screen remains open as long as the cursor is moved in said screen; the cursor is used to highlight or designate the appropriate word, or word string; and the user selects the appropriate word, or word string by clicking on a mouse button or depressing a key.

An example using the English language is illustrative. In this example, the user is presented with a virtual keyboard arranged in the standard QWERTY arrangement on the display means. The user desires to input the word "soap" into the computer (for an application, operating system command, or the like). To do so, the user manipulates the cursor over the geographic area of the virtual keyboard where the "S" words appear on the virtual keyboard; as indicated, cursor manipulation may occur though computer mouse, keyboard cursor control, or other techniques involving touch screens, "pen" or finger input, optical, or voice recognition means. Upon placement over the geographic area where the "S" words appear, a list window will open on the display means and can be set to any size including completely laying over the entire keyboard screen; the opening may occur automatically as the cursor is placed over the appropriate geographic area on the virtual keyboard or upon input of a specified command such as a mouse click. The set list includes every word in the English language that begins with the letter "S". (As an option, phrases that begin with the letter "S" may also be included). Due to the size of the contents of the set list, such contents will not be visible to the user but will instead be presented in a reduced form. The presentation occurs in a logical manner; in this example the set list window will include words arranged in an alphabetical manner, with words beginning with "SA" and the like at the top-left corner of the list, and words beginning with "SY" and the like at the bottom-right corner of the list. The user then manipulates the cursor, using any of the techniques of the present invention through magnification of words and movement through relative spaces, described above, through the set list. As the user manipulates the cursor in the set list, words appear adjacent to the cursor in a magnified form in an insert box. Thus, if the user places the cursor near the bottom of the set list, words will be magnified according to an alphabetized manner. In this example, the user may place the cursor in the bottom portion of the set list to have the word "synergy" appear in a magnified form, with the magnified form having a number of other words appearing based upon the user's insert box word resolution selection parameters. Based on this word, the user knows to move the cursor in a given direction to find the word "soap." In this example based on alphabetical ordering, the user would manipulate the cursor upwards in the set list window. As such manipulation occurs, other magnified words will cross through the insert box: for example, "stem," "square," and "sponge" might appear to the user in magnified form as the cursor and insert box are manipulated through the set list screen. This process occurs until the desired word "soap" appears in magnified form in the insert box. Upon presentation of the word "soap," the user selects the word. Selection can occur through a variety of techniques, such as by clicking on a computer mouse button or by striking an appropriate key in a regular keyboard attached to the computer system, or any other user defined manner. Once selection occurs, the word is used in the manner designated by the user. For example, if the present invention of a virtual keyboard were utilized in a word processing program, the word would appear in a document created by that program. After selection, the set list would close, thereby allowing the user to repeat the process with the next word or phrase desired to be input.

The above example showed the use of the present invention in the English language; of course, the invention will be most useful in the input of non-English language words or phrases, particularly those based on characters. In these systems the user will be presented with a virtual keyboard of specific language characters of the users choosing. Upon designation by cursor manipulation, a set list appears in a separate window containing all words and/or phrases associated with that character, arranged in a manner most appropriate to that specific language. The user then uses the selection technique described above to locate (via magnification) the specific word or phrase to be input into the computer system.

Thus, according to an embodiment of the present invention, an appropriate area of a computer monitor will contain the keyboard (unless a separate input device, such as a touch screen is used), which may be of words in a given language. The words will be set in the keyboard in a particular manner, usually in a logical order with words beginning with first character in the language or other defined text to be input at one position, and words beginning with the last character in the language or other defined text to be input at an opposite position. (For example, for the English language words beginning with the letter "A" may appear in the left portion of the keyboard, with the word "a" in the first position, and words beginning with the letter "Z" may appear in the right portion of the keyboard, with the word "zymosan" in the last position, with all other words in between these two positions; all the words of the language may be organized as they are organized in a dictionary, or any other logical order.

While each word may be too small to be visible to the eye, by moving a text input device such as a mouse computer controlling a cursor, the previously invisible words may be made visible by magnification techniques known in the art. Wherever the cursor is located, the word or words that are at the location of the cursor at that moment will be made visible in an enlarged size in a window that appears on either side of the cursor. When the user finds the desired word, by appropriate selection technique the enlarged area will be held stable; the user may then move the cursor to the desired word and select (again, by appropriate selection techniques) that word. After word selection, the stable window will close.

The present invention also provides the user the ability to change resolutions of the magnified input box. Thus, if the area of the keyboard held stable by cursor movement contains a number of words, the user may, by an appropriate selection technique known in the computer art, change the resolution of the words to be larger or smaller, and inversely impact the number of the words seen in the magnification window. Thus, if in the regular resolution there are 60,000 words on the board, in the magnified resolution the user may have ten words each in a viewable font.

The present invention will also provide users the ability to customize the keyboard in a variety of ways they will be able to change the starting resolution as well as set the keyboard to just professional words of a particular subject matter. For example, a medical doctor will be able to reduce the number of words to include only option used in medical jargon, both in the keyboard as well as in the thesaurus. In another situation, the user will be able to remove words that they never use and thus reduce the number of words on the keyboard at any given time to include only the needed jargon.

As noted, the present invention may utilize different input techniques known in the art, all of which manipulate a cursor or other pointing symbol to activate a portion of the keyboard desired by the user. Thus, a computer mouse, a person's finger, a pen, movement keys (left, right, up, and down keys on a standard computer keyboard) all are contemplated as selection devices in the present invention. Other techniques, such as voice recognition systems to manipulate a cursor, may also be used. In addition, optical input systems, which detect eye movement and convert this movement into cursor movement, may also be used.

As will be understood by those skilled in the art, the skilled practitioner may make many changes in the apparatus and methods described above without departing from the spirit and scope of the invention.

I claim:

1. A text input apparatus comprising:
    a display device, configured to simultaneously display a first display area and a second display area wherein said first display area and said second display area are distinct;
    a computing device; and
    an input device;
    wherein the text input apparatus is configured to display a character or plurality of characters in the first display area,
    wherein said input device operates with said computing device to enlarge a portion of said character or plurality of characters in the first display area when an identifier is positioned near said portion of said character or plurality of characters, and
    wherein the second display area displays the enlarged portion of said character or plurality of characters.

2. The text input apparatus of claim 1, wherein said display device is a cathode ray tube operating in conjunction with said computing device.

3. The text input apparatus of claim 1, wherein said display device is a liquid crystal display operating in conjunction with said computing device.

4. The text input apparatus of claim 1, wherein said input device is a computer mouse operating in conjunction with said computing device.

5. The text input apparatus of claim 1, wherein said input device is a pen device operating in conjunction with said computing device.

6. The text input apparatus of claim 1, wherein said input device is a voice recognition method operating in conjunction with said computing device.

7. The text input apparatus of claim 1, wherein said input device is an optical recognition method operating in conjunction with said computing device.

8. The text input apparatus of claim 1, wherein said operation of said input device manipulates a cursor generated by said computing device on said display device.

9. The text input apparatus of claim 1, wherein the enlargement of said character or plurality of characters varies according to the manipulation of said input device.

10. The text input apparatus of claim 1, wherein said character or plurality of characters is displayed on said display device in a manner not recognized by the user.

11. The text input apparatus of claim 1, wherein said character or plurality of characters is displayed on said display device in a manner designated by said computing device and manipulated by said user.

12. The text input apparatus of claim 1, wherein said character or plurality of characters is displayed in a set list, comprising a subset of possible text input wherein said set list is displayed for a length of time, and wherein said user selects one character or plurality of characters from said set list.

13. The text input apparatus of claim 1, wherein said character or plurality of characters represent words in a language.

14. The text input apparatus of claim 1, wherein upon selection of a character or plurality of characters using said input device, said character or plurality of characters are used in conjunction with a dictionary.

15. The text input apparatus of claim 1, wherein upon selection of a character or plurality of characters using said input device, said character or plurality of characters are used in conjunction with a thesaurus.

16. A method for text input comprising the following steps:
    generating a character or plurality of characters in a computing device;
    displaying on a display device having distinct and simultaneously displayed first and second display area, said generated character or plurality of characters in the first display area;
    positioning an identifier near a portion of said character or plurality of characters in the first display area;
    enlarging and displaying the portion of said character or plurality of characters in the second display area simultaneously with said character or plurality of characters displayed in the first display area;
    selecting said enlarged portion of said character or plurality of characters.

17. The method of claim 16, wherein said display device is a cathode ray tube operating in conjunction with said computing device.

18. The method of claim 16, wherein said display device is a liquid crystal display operating in conjunction with said computing device.

19. The method of claim 16, wherein said input device is a computer mouse operating in conjunction with said computing device.

20. The method of claim 16, wherein said input device is a pen device operating in conjunction with said computing device.

21. The method of claim 16, wherein said input device is a voice recognition method operating in conjunction with said computing device.

22. The method of claim 16, wherein said input device is an optical recognition method operating in conjunction with said computing device.

23. The method of claim 16, wherein said operation of said input device manipulates a cursor generated by said computing device on said display device.

24. The method of claim 16, wherein the enlarging of said character or plurality of characters varies according to the manipulation of said input device.

25. The method of claim 16, wherein said displaying of said character or plurality of characters occurs in a manner not recognized by the user.

26. The method of claim 16, wherein said displaying of said character or plurality of characters occurs in a manner designated by said computing device and manipulated by said user.

27. The method of claim 16, wherein said displaying of said character or plurality of characters occurs as a set list comprised of a subset of the whole.

28. The method of claim 27, wherein said set list is displayed for a length of time.

29. The method of claim 16, wherein said character or plurality of characters represent words in a language.

30. The method of claim 16, comprising the additional step of operating said selected character or plurality of characters with a dictionary.

31. The method of claim 16, comprising the additional step of operating said selected character or plurality of characters with a thesaurus.

* * * * *